(No Model.)
J. N. FARLOW.
HAME.
No. 384,030. Patented June 5, 1888.
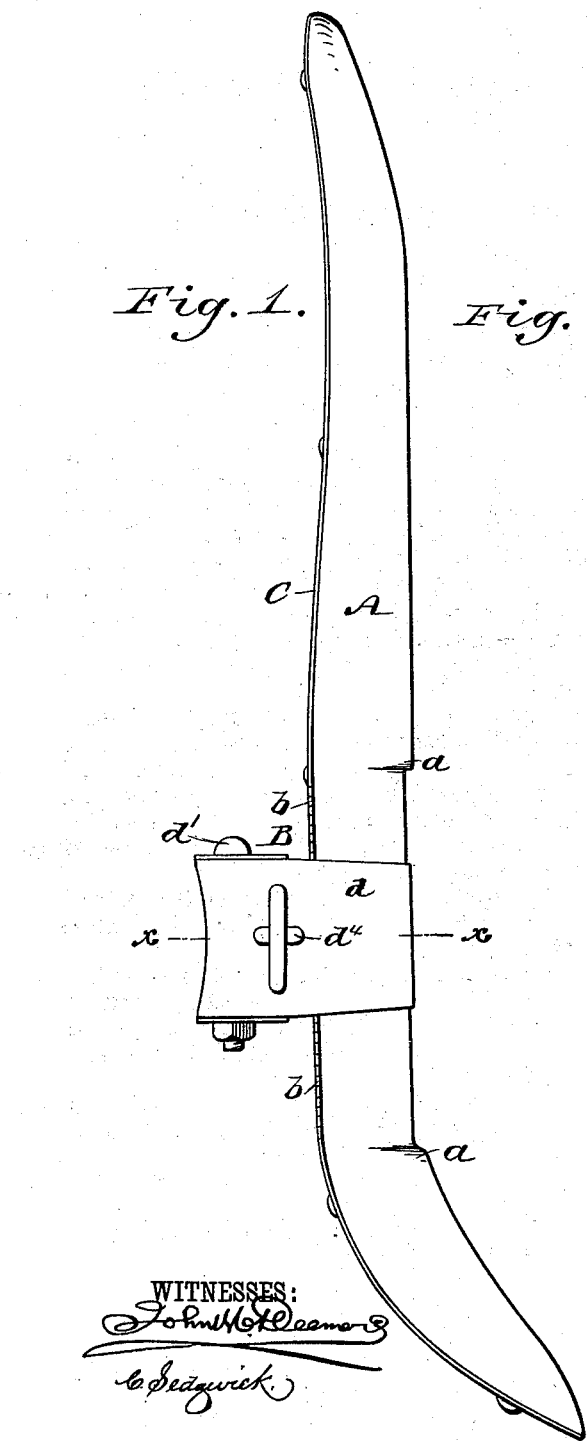
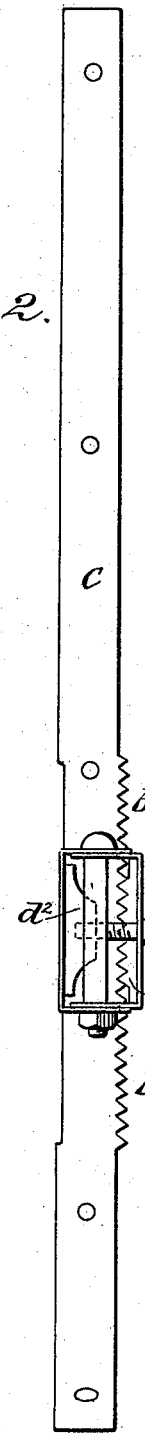
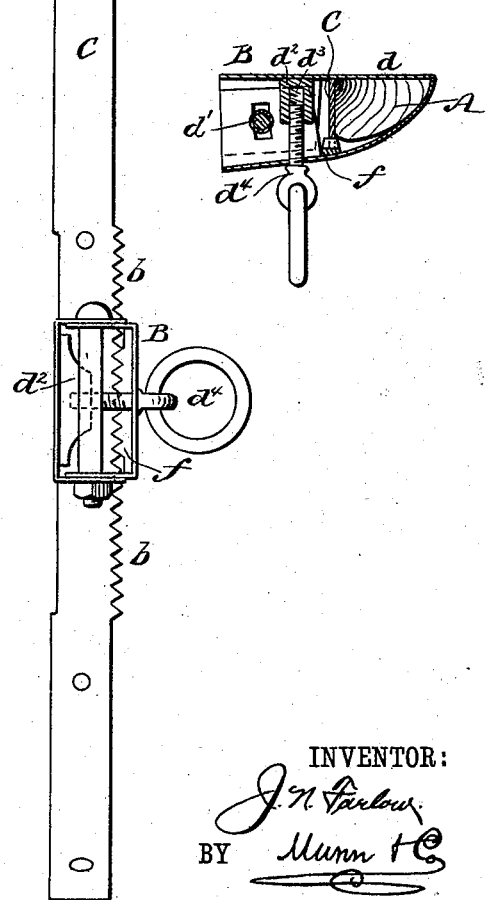
WITNESSES:
INVENTOR:
J. N. Farlow.
BY Munn & Co.
ATTORNEYS.

UNITED STATES PATENT OFFICE.

JAMES NELSON FARLOW, OF LANDER, WYOMING TERRITORY.

HAME.

SPECIFICATION forming part of Letters Patent No. 384,030, dated June 5, 1888.

Application filed March 31, 1888. Serial No. 269,125. (No model.)

*To all whom it may concern:*

Be it known that I, JAMES NELSON FARLOW, of Lander, in the county of Fremont, Wyoming Territory, have invented a new and useful Improvement in Hames, of which the following is a full, clear, and exact description.

The object of my invention is to provide a practical hame and hame-tug fastening or clip which may be adjusted to raise or lower the draft; and to this end my invention consists, principally, in forming the hame with notches, and in combining therewith a sliding clip provided with notches, a bolt or fastening for the hame-tug, and a screw and nut to close the teeth of the clip into the teeth of the hame.

The invention also consists in the construction, arrangement, and combination of parts, all as hereinafter described and claimed.

Reference is to be had to the accompanying drawings, forming a part of this specification, in which similar letters of reference indicate corresponding parts in all the figures.

Figure 1 is a front elevation of my new and improved hame and hame-clip. Fig. 2 shows the outer edge of the hame and clip, and Fig. 3 is a sectional view taken on the line $x\ x$ of Fig. 1.

The wooden portion, A, of the hame is slightly reduced in size to form the shoulders $a\ a$, to limit the up-and-down movement of the clip B, and the outer edge of the hame-iron C is formed with numerous notches, $b\ b$. The clip B is composed of a loop or frame, $d$, adapted to be placed around or to slip over the hame, and is provided with the bolt $d'$, to which the hame-tug (not shown) may be attached. Upon the inner surface of the clip is formed or secured the block $d^2$, screw-tapped at $d^3$, to receive the bolt $d^4$. Opposite the block $d^2$ the clip is formed or provided with a series of notches or teeth, $f$, which are adapted to engage with the teeth $b$ of the hame-iron C, for holding the clip B at any desired position upon the hame.

By turning the bolt $d^4$ outward the teeth $f$ may be disengaged from the teeth $b$, so that the clip may be raised or lowered, as desired, and by turning said bolt the teeth $f$ may be held in firm contact with the teeth $b$, so that the clip will be firmly held in any position at which it may be adjusted.

Having thus described my invention, what I claim as new, and desire to secure by Letters Patent, is—

1. The hame A, having teeth $b$, in combination with the clip B, having teeth $f$, a bolt, $d^4$, and a screw-socket for closing the teeth $f$ into the teeth $b$, substantially as and for the purposes set forth.

2. The hame A, having teeth $b$, and the clip
B, having the teeth $f$, and screw-socket $d^2$, placed upon the hame, in combination with the bolt $d^4$, substantially as described, for the purposes set forth.

JAMES NELSON FARLOW.

Witnesses:
F. G. BURNETT,
F. E. RICE.